(12) United States Patent
Furmanek (10) Patent No.: US 9,920,921 B2
(45) Date of Patent: Mar. 20, 2018

(54) BUILDING COMPONENT

(71) Applicant: Marek Furmanek, Zakrzowek (PL)

(72) Inventor: Marek Furmanek, Zakrzowek (PL)

( * ) Notice: Subject to any disclaimer, the term of this patent is extended or adjusted under 35 U.S.C. 154(b) by 0 days.

(21) Appl. No.: 14/431,990

(22) PCT Filed: Sep. 26, 2013

(86) PCT No.: PCT/PL2013/000121
§ 371 (c)(1),
(2) Date: Mar. 27, 2015

(87) PCT Pub. No.: WO2014/051446
PCT Pub. Date: Apr. 3, 2014

(65) Prior Publication Data
US 2015/0241052 A1 Aug. 27, 2015

(30) Foreign Application Priority Data

Sep. 27, 2012 (PL) .......................................... 400957

(51) Int. Cl.
*F21V 33/00* (2006.01)
*E04F 13/074* (2006.01)
*F21Y 115/10* (2016.01)

(52) U.S. Cl.
CPC .......... *F21V 33/006* (2013.01); *E04F 13/074* (2013.01); *E04F 2290/023* (2013.01); *E04F 2290/026* (2013.01); *F21Y 2115/10* (2016.08)

(58) Field of Classification Search
CPC .. F21S 2/005; F21S 8/022; F21S 8/033; F21S 4/001; F21S 4/10; F21S 8/04; F21S 10/02;
(Continued)

(56) References Cited

U.S. PATENT DOCUMENTS 4,697,950 A * 10/1987 Copeland ................ E01C 17/00
116/63 R
4,912,610 A * 3/1990 Dahlberg .................. B64F 1/20
362/153.1

(Continued)

FOREIGN PATENT DOCUMENTS

DE 102007039416 A1 2/2009
WO WO 2007037712 A1 * 4/2007 ............ F21V 33/006
WO WO 2012138095 A2 * 10/2012 .......... F21V 33/0012

OTHER PUBLICATIONS

International Search Report issued for International Patent Application No. PCT/PL2013/0000121, dated Dec. 2, 2013.

*Primary Examiner* — Hargobind S Sawhney
(74) *Attorney, Agent, or Firm* — Blank Rome LLP (57) ABSTRACT

The presented invention facilitates creation of floors and other utilitarian spaces incorporating supplementary, illuminated decorations. It may be utilized in house and public facilities building-oriented branches of construction industry, and in the furniture joinery industry. It can also be incorporated into already finished spaces.
The building component is characteristic due to the fact that it is based on utilization of the bottom layer (7), the satisfactory thickness of which shall oscillate around 2÷18 mm, intermediate light forwarding layer (3), the thickness of which shall range from 3 to 18 mm (the additional elements of the design, such as indents, and/or engraves, and/or channels, in which light elements (4) are situated, and/or light mat (8), and top layer (1), the thickness of which shall oscillate around 1÷18 mm, and in which the elements of the design, such as decorative indents, shall be also incorporated (2). The aforementioned elements shall be filled with a special material, such as resin, and/or glass, and/or adhesive substances, and/or transparent substances. The utilized light sources (4) are LED diodes and/or LED diode sets, and/or (Continued)

optical fibers, and/or halogen lamps, and/or cold cathodes, and/or light mat. The aforementioned light sources (4) are located in a circular manner, and/or separate fashion, and/or between the bottom layer (7) and the top layer (1). The building component may incorporate a heating mat (6) situated below the light mat, as well as an additional layer (9), preferably of the thickness of 1÷12 mm and supplementary elements of the design (10), preferably of the thickness of 1÷12 mm.

15 Claims, 4 Drawing Sheets (58) Field of Classification Search
 CPC .......... F21S 4/28; F21V 33/006; F21V 3/049;
 F21V 9/10; F21V 21/0824; F21V
 23/0435; F21V 33/00; F21V 15/00;
 F21W 2111/02; F21W 2111/06; F21W
 2121/00; F21Y 2101/02; F21Y 2103/00;
 F21Y 2103/003; F21Y 2105/001; F21Y
 2113/002; F21Y 2115/10; F21Y 2105/10;
 F21K 9/00; F21K 9/52; G02B 6/0051;
 G02B 6/0078; G02B 6/0028; G02B
 6/005; G02B 5/22; E04B 9/28; E04B
 5/46; E04C 1/42; E04C 2/546; E01C
 17/00; G09F 13/18; G09F 2019/223;
 G09F 13/0404; G09F 13/0409; G09F
 13/0413; E01F 9/559; E01F 9/615; H01H
 2009/187; H01H 9/182; E04F 13/074;
 E04F 2290/026
 See application file for complete search history.

(56) References Cited

U.S. PATENT DOCUMENTS

| | | | | | |
|---|---|---|---|---|---|
| 4,951,181 | A | * | 8/1990 | Phillips | A47B 13/12 312/223.5 |
| 4,992,914 | A | * | 2/1991 | Heiss | E01C 17/00 362/153.1 |
| 5,006,967 | A | * | 4/1991 | Diamond | E04C 1/42 362/147 |
| 5,038,542 | A | * | 8/1991 | Kline | E04C 1/42 40/545 |
| 5,249,104 | A | * | 9/1993 | Mizobe | G02B 6/0018 362/327 |
| 5,556,189 | A | * | 9/1996 | Wallis | B64F 1/20 362/153.1 |
| 6,026,602 | A | * | 2/2000 | Grondal | G02B 6/0055 362/800 |
| 6,061,489 | A | * | 5/2000 | Ezra | G02B 27/0093 313/115 |
| 6,116,751 | A | * | 9/2000 | Remp | E01C 17/00 362/153 |
| 6,354,714 | B1 | * | 3/2002 | Rhodes | F21S 4/24 362/145 |
| 7,022,387 | B1 | * | 4/2006 | Fertig | E04C 1/42 362/806 |
| 7,374,327 | B2 | * | 5/2008 | Schexnaider | F21S 8/04 362/394 |
| 8,092,034 | B2 | * | 1/2012 | Zarian | F21V 33/006 362/145 |
| 8,235,542 | B2 | * | 8/2012 | Yohananoff | E01C 17/00 362/153 |
| 8,343,571 | B2 | * | 1/2013 | Werners | B32B 17/10036 313/498 |
| 8,905,571 | B2 | * | 12/2014 | Sigler | G02B 6/0096 362/153 |
| 9,159,253 | B2 | * | 10/2015 | Wang | F21S 4/001 |
| 2004/0246714 | A1 | * | 12/2004 | Talamo | E01C 17/00 362/225 |
| 2006/0248761 | A1 | * | 11/2006 | Cheung | G09F 13/04 40/564 |
| 2008/0037284 | A1 | * | 2/2008 | Rudisill | F21S 2/005 362/629 |
| 2008/0313977 | A1 | * | 12/2008 | Banister | H02S 40/42 52/173.3 |
| 2009/0114928 | A1 | * | 5/2009 | Messere | B32B 17/10 257/88 |
| 2009/0116241 | A1 | * | 5/2009 | Ashoff | F21V 33/006 362/253 |
| 2010/0001297 | A1 | * | 1/2010 | Takashima | H01L 33/60 257/88 |
| 2012/0281387 | A1 | * | 11/2012 | Tung | F21V 31/04 362/84 |

* cited by examiner

BUILDING COMPONENT

CROSS-REFERENCE TO RELATED APPLICATIONS

This application is a Section 371 National Stage application of International Application No. PCT/PL2013/000121, filed Sep. 26, 2013, and published as WO/2014/051446, on Apr. 3, 2014, in English, which claims priority to and benefits of Polish Patent Application No. P.400957, filed Sep. 27, 2012, the contents of which are hereby incorporated by reference in their entirety.

BACKGROUND

The invention can be characterized as a building component, which may be utilized for interior and external facades finishing in both house and public facilities building-oriented branches of construction industry. The aforementioned item may be therefore utilized to finish and decorate such spaces as: floors, walls, ceilings, facades of the buildings, pools, as well as advertisement-related and informational banners. What is more, the component may be also of use in the furniture joinery industry.

Currently, numerous finishing elements have been invented and patented. The utilization of feathered floor panels is widespread in the modern building industry. Additionally, the panels, which are combined together mechanically and without the necessity to take advantage of any adhesive substances are also widely recognizable and their popularity is constantly increasing. Furthermore, a special floor finishing material, the base of which is wooden, veneered material are used in construction industry in a widespread fashion. The aforementioned material incorporates the hardboard core, the thickness of which oscillates around 6÷9 mm, the top layer of the thickness of 0.2÷0.8 mm, as well as the balancing bottom layer, the thickness of which ranges from 0.1 to 0.6 mm. The top layer is designed in such a way to ensure the durability and proper look of the material.

After proper familiarization with the description of invention no. PL 209069, one may identify a wall-finishing medium, which is made mostly out of glass, especially in the form of tiles. The medium may be used to cover the walls of houses, as well as to decorate brick walls, floors, and ceilings. The aforementioned material has a glass base, which is covered with a layer of waterproof varnish. The material is characteristic due to the fact that it may be attached to the walls by means of bedding mortars or cement glues.

After proper familiarization with the description of invention no. PL 208985, one may identify a hanging ceiling, which is created on the basis of utilization of a load bearing plate, made out of sheets of rigid material combined together, which is then attached to additional load bearing elements. Some of the elements of the plate are translucent, and there is at least one source of light located above the hanging plate. The aforementioned plate has additional holes, which may be of the same or similar diameter, inside which a translucent glass plate is located. What is more, the bearing plate is created out of few sheets of material, being separate layers of the plate. The holes in the layers have the same shapes, but the diameter of the upper layer is bigger than the one of the lower layer. Such a design makes it possible to create a notch, on the edges of which the aforementioned glass plate is located.

After proper familiarization with the description of invention no. P.380135, one may identify a panel, which incorporates a screen, the edges of which are additionally illuminated. The inscriptions are made on the screen by means of a fluorescent paint, special crayon, or marker. The screen has the form of a transparent, light transmitting plate, which is located in a frame. The frame is equipped with at least one source of light, attached to at least one side of the construction. According to the description of the invention, there shall be a light reflecting component incorporated into the frame as well. The dark screen is attached to the rear side of the panel, which absorbs at least some of the visible light, and the light reflecting component is surrounded by the edges of the plate, being fragments of side and front layers of the panel.

The light source is located in such a way that the light ray is directed to the inside of the plate, near to the edges surrounded by the light reflecting element.

After proper familiarization with the description of invention no. P.366476, one may identify a decorative element in the form of a tile of random shape and size, which is characteristic due to the fact that it incorporates light sources, preferably—diodes or optical fibers, which illuminate the front layer of the tile. The light sources are attached to the tile, preferably—to its rear layer. The light sources may be located separately or in a linear manner.

After proper familiarization with the description of invention no. Nr P.381276, one may identify a technology of installation of a floor, which is illuminated by means of LCD or plasma displays. The technology is based on combination of two basic solutions: the integration of LCD or plasma displays (controlled by means of a computer) to create a single broadcasting screen installed on the wall or ceiling, as well as illuminated floor (the light sources in such a case are light bulbs, LED diodes, etc.). The floor is covered with a layer of chilled glass, attached to a load bearing construction. According to the assumptions of the technology such a floor may be installed in clubs, pubs, concert halls, TV studios, and in other places, where mass events are to be organized.

SUMMARY

The aim of the invention is to facilitate proper finishing of constructions by means of attaching additional decorative elements. The invention may be also utilized in already constructed object and adjusted to existing finishing elements.

The component is characteristic due to its design, being based on utilization of the bottom layer, the satisfactory thickness of which shall oscillate around 2÷18 mm, intermediate light forwarding layer the thickness of which shall range from 3 to 18 mm (the additional elements of the design, such as a transparent filling and light elements, shall be situated in the aforementioned layer), and top layer, the thickness of which shall oscillate around 1÷18 mm, and in which the elements of the design shall be also incorporated and properly filled in, preferably—in the transparent manner. The light sources are LED diodes and/or LED diode sets, and/or optical fibers, and/or halogen lamps, and/or cold cathodes, and/or light mat. The light sources are located in a circular manner, and/or separate fashion, and/or between the bottom layer and the top layer. There is a fixed light mat located between the bottom construction layer and the light transmitting layer.

The top layer of the item is made out of wood, and/or wood-like materials, and/or ceramics, and/or grout, and/or natural stone, and/or glass, and/or bakelite, and/or conglomerate, and/or metal, and/or fabric and cement, and/or glass with painted bottom layer, and/or processed glass, and/or plastics, and/or resin. The top layer incorporates a transparent element, produced out of resins, and/or glass, and/or adhesive materials, and/or mineral ores, and/or a non-transparent element produced out of non-transparent mineral ores, and/or grout, and/or stones, and/or ores. The preferable thickness of the element shall oscillate around 1÷12 mm. The element is to be located inside the light transmitting layer, and/or inside the top layer. The light transmitting layer incorporates an additional layer, being made out of glass, and/or resin, and/or PLEXI glass, and/or polycarbonate, and/or adhesive preparations. The preferable thickness of the aforementioned layer shall range from 1 to 12 mm (with all other elements of the design attached). There is a heating mat situated between the bottom layer and the light transmitting layer.

The advantages of the invention are the simplicity of the design, making it possible to take advantage of the item in numerous applications, as well as easiness of assembly and disassembly. The additional advantage from the point of view of the end user is the uniqueness of the solution, which may be utilized to improve the interior design of clubs, pubs, offices, flats, etc.

The invention may be also utilized in already constructed object and adjusted to existing finishing elements. In the case of the presented invention, the plate-based design may be modified and adjusted to facilitate the utilization of the item in such unusual places as bathtubs and laptop covers.

BRIEF DESCRIPTION OF THE DRAWINGS

The presented figures, namely

The invention has the initial form of a square, the dimensions of which are equal to 598 mm×598 mm, but the size may be adjusted to suit a particular application. The building component may also have the form of a rectangle or oval, and its upper layer may be flat, concave, or convex.

The building component incorporates a top layer 1, made out of wood, and the layer, where the key elements 2 of the design are located. This layer shall be a light transmitting layer 3, being additionally equipped with suitable light sources 4. The key elements of the design 2 are also located in the top layer 1 and may be additionally situated in the supplementary layer 9, made out of glass, resin, PLEXI glass, polycarbonate, or adhesive substances. The thickness of the aforementioned layer shall preferably not exceed 10 mm after all elements of the design 10 being assembled. The top layer 1 is made out of wood, but may be also made out of wood-like materials, ceramics, grout, natural stone, glass, Bakelite, conglomerate, metal, fabric and cement, glass with painted bottom layer, processed glass, plastics, or resin. The building component also incorporates a bottom layer 7 of the thickness of 4 mm, which may be made out of glass, as well as of plywood, grout, metal, fabric and cement, PVC, or resin.

DETAILED DESCRIPTION OF THE ILLUSTRATIVE EMBODIMENTS

The bottom layer 7 is connected to the light transmitting layer 3, which may be made out of glass, as well as transparent resin, PLEXI glass, or polycarbonate, the thickness of which shall be equal to 10 mm. The aforementioned layer incorporates key elements of the design 2, being covered with glass. The covering materials, which may also be used, are resin, adhesive substances, as well as transparent materials. The light sources 4 are located in a circular manner or in separate fashion inside the aforementioned layer. The light sources used 4 may be LED diodes, as well as LED diode sets, optical fibers, halogen lamps, or cold cathodes. A light mat 8, being located between the bottom layer 7 and the light transmitting 3 may be utilized as an optional medium. The light sources may also be located on the edges 5 of the layer. The building element may also be equipped with a heating mat 6, which may be located next to or instead of the light mat.

Figure 1:
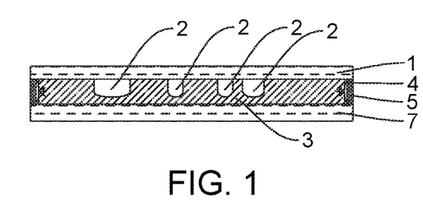
—FIG. 1, FIG. 2, FIG. 3, FIG. 4, and FIG. 5 show the intersection of the building component, together with presentation of preferable location of light sources.

FIG. 1 presents the aforementioned building component, which consists of the top layer 1 combined with the light transmitting layer 3, in which the key elements of the design 2 are located. The light transmitting layer 3 is directly connected to the bottom layer 7, the light sources 4 are located in the upper part of which. Between the top layer 1 and the bottom layer, 7 there are properly shaped edges 5.

Figure 2:
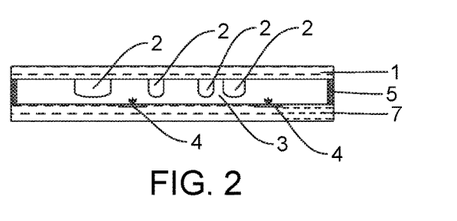

FIG. 2 presents the aforementioned building component, which consists of the top layer 1 combined with the light transmitting layer 3, in which the key elements of the design 2 are located. The light transmitting layer 3 is directly connected to the bottom layer 7, the light sources 4 are located in the upper part of which. Between the top layer 1 and the bottom layer, 7 there are properly shaped edges 5.

Figure 3:
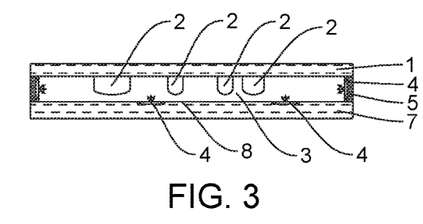

FIG. 3 presents the aforementioned building component, which consists of the top layer 1 combined with the light transmitting layer 3, in which the key elements of the design 2 are located. The light transmitting layer 3 is directly connected to the bottom layer 7, the light sources 4 are located in the upper part of which. Between the top layer 1 and the bottom layer, 7 there are properly shaped edges 5.

Figure 4:
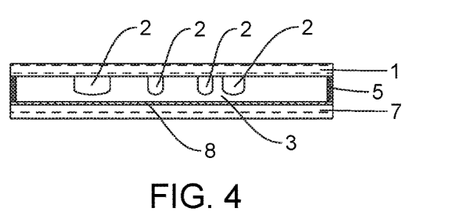

FIG. 4 presents the aforementioned building component, which consists of the top layer 1 combined with the light transmitting layer 3, in which the key elements of the design 2 are located. The light transmitting layer 3 is directly connected to the bottom layer 7 (with the light mat 8 attached to it), the light sources 4 are located in the upper part of which. Between the top layer 1 and the bottom layer, 7 there are properly shaped edges 5.

Figure 5:
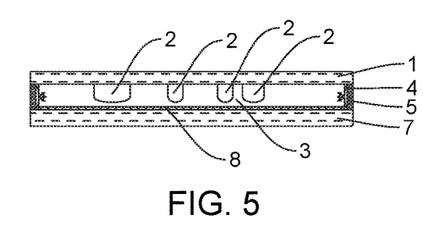

FIG. 5 presents the aforementioned building component, which consists of the top layer 1 combined with the light transmitting layer 3, in which the key elements of the design 2 are located. The light transmitting layer 3 is directly connected to the bottom layer 7 (with the light mat 8 attached to it), the light sources 4 are located in the upper part of which. Between the top layer 1 and the bottom layer, 7 there are properly shaped edges 5.

Figure 6:
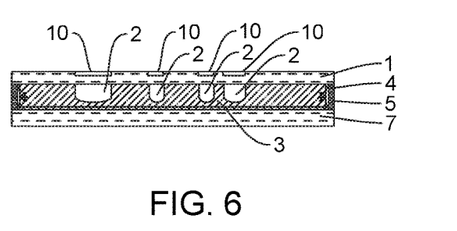
FIG. 6, FIG. 7, FIG. 8, and FIG. 9 show the intersection of the alternative, second version of the building component, together with presentation of preferable location of light sources.

FIG. 6 presents the aforementioned building component, which consists of the top layer 1 combined with the light transmitting layer 3, in which the key elements of the design 2 are located. There are additional elements of the design 10 attached to the upper part of the top layer 1. The light transmitting layer 3 is directly connected to the bottom layer 7, the light sources 4 are located in the upper part of which. Between the top layer 1 and the bottom layer, 7 there are properly shaped edges 5.

Figure 7:
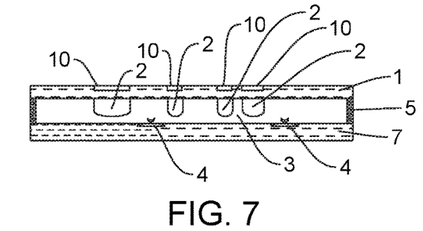

FIG. 7 presents the aforementioned building component, which consists of the top layer 1 combined with the light transmitting layer 3, in which the key elements of the design 2 are located. There are additional elements of the design 10 attached to the upper part of the top layer 1. The light transmitting layer 3 is directly connected to the bottom layer 7, the light sources 4 are located in the upper part of which. Between the top layer 1 and the bottom layer, 7 there are properly shaped edges 5.

Figure 8:
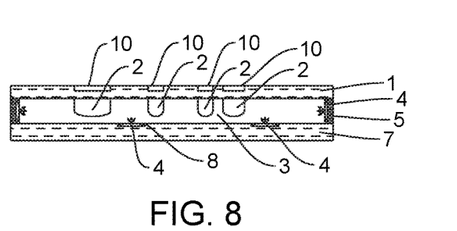

FIG. 8 presents the aforementioned building component, which consists of the top layer 1 combined with the light transmitting layer 3, in which the key elements of the design 2 are located. There are additional elements of the design 10 attached to the upper part of the top layer 1. The light transmitting layer 3 is directly connected to the bottom layer 7, the light sources 4 are located in the upper part of which. Between the top layer 1 and the bottom layer, 7 there are properly shaped edges 5.

Figure 9:
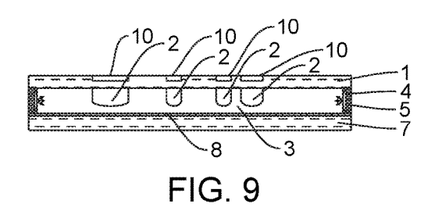

FIG. 9 presents the aforementioned building component, which consists of the top layer 1 combined with the light transmitting layer 3, in which the key elements of the design 2 are located. There are additional elements of the design 10 attached to the upper part of the top layer 1. The light transmitting layer 3 is directly connected to the bottom layer 7 (with the light mat 8 attached to it), the light sources 4 are located in the upper part of which. Between the top layer 1 and the bottom layer, 7 there are properly shaped edges 5.

Figure 10:
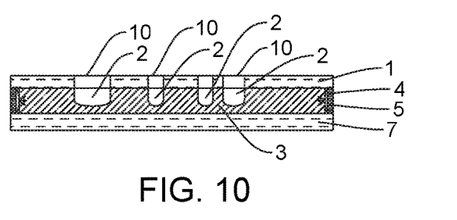
FIG. 10, FIG. 11, FIG. 12, and FIG. 13 show the intersection of the alternative, third version of the building component, together with presentation of preferable location of light sources.

FIG. 10 presents the aforementioned building component, which consists of the top layer 1 combined with the light transmitting layer 3, in which the key elements of the design 2 are located. There are additional elements of the design 10 attached to the upper part of the top layer 1. The light transmitting layer 3 is directly connected to the bottom layer 7, the light sources 4 are located in the upper part of which. Between the top layer 1 and the bottom layer, 7 there are properly shaped edges 5.

Figure 11:
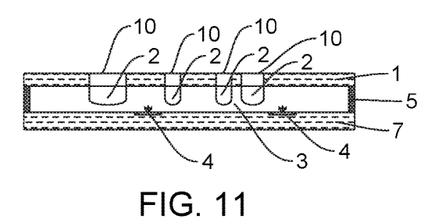

FIG. 11 presents the aforementioned building component, which consists of the top layer 1 combined with the light transmitting layer 3, in which the key elements of the design 2 are located. There are additional elements of the design 10 attached to the upper part of the top layer 1. The light transmitting layer 3 is directly connected to the bottom layer 7, the light sources 4 are located in the upper part of which. Between the top layer 1 and the bottom layer, 7 there are properly shaped edges 5.

Figure 12:
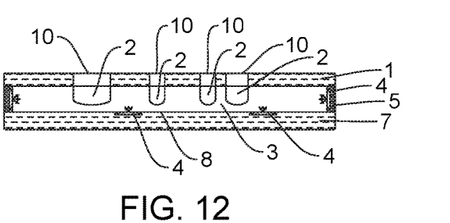

FIG. 12 presents the aforementioned building component, which consists of the top layer 1 combined with the light transmitting layer 3, in which the key elements of the design 2 are located. There are additional elements of the design 10 attached to the upper part of the top layer 1. The light transmitting layer 3 is directly connected to the bottom layer 7, the light sources 4 are located in the upper part of which. Between the top layer 1 and the bottom layer, 7 there are properly shaped edges 5.

Figure 13:
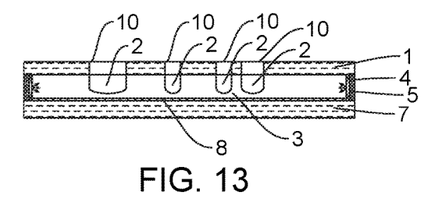

FIG. 13 presents the aforementioned building component, which consists of the top layer 1 combined with the light transmitting layer 3, in which the key elements of the design 2 are located. There are additional elements of the design 10 attached to the upper part of the top layer 1. The light transmitting layer 3 is directly connected to the bottom layer 7 (with the light mat 8 attached to it), the light sources 4 are located in the upper part of which. Between the top layer 1 and the bottom layer, 7 there are properly shaped edges 5.

Figure 14:
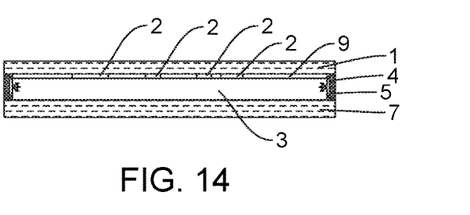
FIG. 14, FIG. 15, FIG. 16, FIG. 17, and FIG. 18 show the intersection of the alternative, fourth version of the building component, together with presentation of preferable location of light sources.

FIG. 14 presents the aforementioned building component, which consists of the top layer 1 combined with an additional layer 9, in which the key elements of the design 2 are located. The light transmitting layer 3 is directly connected to the bottom layer 7, the light sources 4 are located in the upper part of which.

Between the top layer 1 and the bottom layer, 7 there are properly shaped edges 5.

Figure 15:
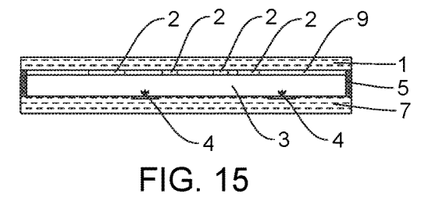

FIG. 15 presents the aforementioned building component, which consists of the top layer 1 combined with an additional layer 9, in which the key elements of the design 2 are located. The light transmitting layer 3 is directly connected to the bottom layer 7, the light sources 4 are located in the upper part of which. Between the top layer 1 and the bottom layer, 7 there are properly shaped edges 5.

Figure 16:
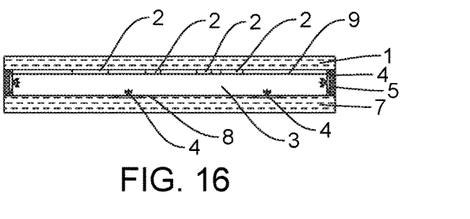

FIG. 16 presents the aforementioned building component, which consists of the top layer 1 combined with an additional layer 9, in which the key elements of the design 2 are located. The light transmitting layer 3 is directly connected to the bottom layer 7, the light sources 4 are located in the upper part of which. Between the top layer 1 and the bottom layer, 7 there are properly shaped edges 5.

Figure 17:
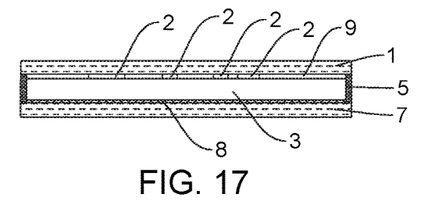

FIG. 17 presents the aforementioned building component, which consists of the top layer 1 combined with an additional layer 9, in which the key elements of the design 2 are located. The light transmitting layer 3 is directly connected to the bottom layer 7 (with the light mat 8 attached to it). Between the top layer 1 and the bottom layer, 7 there are properly shaped edges 5.

Figure 18:
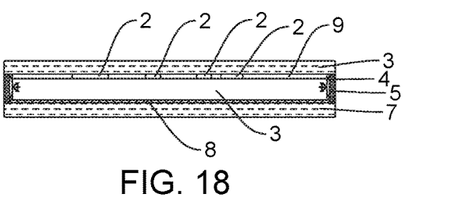

FIG. 18 presents the aforementioned building component, which consists of the top layer 1 combined with an additional layer 9, in which the key elements of the design 2 are located. The light transmitting layer 3 is directly connected to the bottom layer 7 (with the light mat 8 attached to it), the light sources 4 are located in the upper part of which. Between the top layer 1 and the bottom layer, 7 there are properly shaped edges 5.

Figure 19:
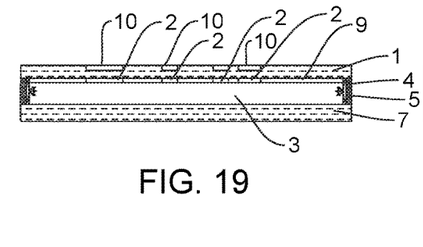
FIG. 19, FIG. 20, FIG. 21, FIG. 22, and FIG. 23 show the intersection of the alternative, fifth version of the building component, together with presentation of preferable location of light sources.

FIG. 19 presents the aforementioned building component, which consists of the top layer 1 combined with an additional layer 9, in which the key elements of the design 2 are located. There are additional elements of the design 10 attached to the upper part of the top layer 1. The light transmitting layer 3 is directly connected to the bottom layer 7, the light sources 4 are located in the upper part of which. Between the top layer 1 and the bottom layer, 7 there are properly shaped edges 5.

Figure 20:
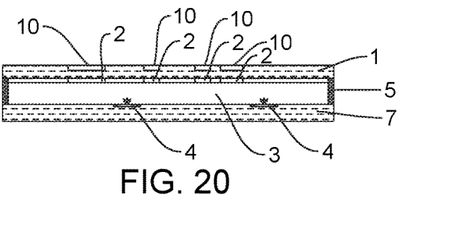

FIG. 20 presents the aforementioned building component, which consists of the top layer 1 combined with an additional layer 9, in which the key elements of the design 2 are located. There are additional elements of the design 10 attached to the upper part of the top layer 1. The light transmitting layer 3 is directly connected to the bottom layer 7, the light sources 4 are located in the upper part of which. Between the top layer 1 and the bottom layer, 7 there are properly shaped edges 5.

Figure 21:
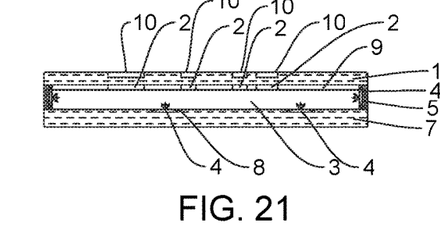

FIG. 21 presents the aforementioned building component, which consists of the top layer 1 combined with an additional layer 9, in which the key elements of the design 2 are located. There are additional elements of the design 10 attached to the upper part of the top layer 1. The light transmitting layer 3 is directly connected to the bottom layer 7, the light sources 4 are located in the upper part of which. Between the top layer 1 and the bottom layer, 7 there are properly shaped edges 5.

Figure 22:
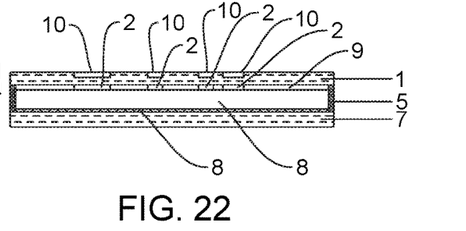

FIG. 22 presents the aforementioned building component, which consists of the top layer 1 combined with an additional layer 9, in which the key elements of the design 2 are located. There are additional elements of the design 10 attached to the upper part of the top layer 1. The light transmitting layer 3 is directly connected to the bottom layer 7 (with the light mat 8 attached to it), the light sources 4 are located in the upper part of which. Between the top layer 1 and the bottom layer, 7 there are properly shaped edges 5.

Figure 23:
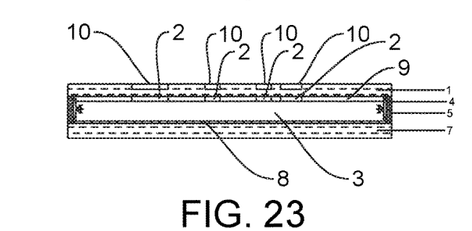

FIG. 23 presents the aforementioned building component, which consists of the top layer 1 combined with an additional layer 9, in which the key elements of the design 2 are located. There are additional elements of the design 10 attached to the upper part of the top layer 1. The light transmitting layer 3 is directly connected to the bottom layer 7 (with the light mat 8 attached to it), the light sources 4 are located in the upper part of which. Between the top layer 1 and the bottom layer, 7 there are properly shaped edges 5.

Figure 24:
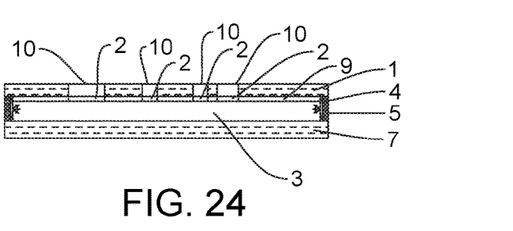
FIG. 24, FIG. 25, FIG. 26, FIG. 27, and FIG. 28 show the intersection of the alternative, sixth version of the building component, together with presentation of preferable location of light sources.

FIG. 24 presents the aforementioned building component, which consists of the top layer 1 combined with an additional layer 9, in which the key elements of the design 2 are located. There are additional elements of the design 10 attached to the upper part of the top layer 1. The light transmitting layer 3 is directly connected to the bottom layer 7, the light sources 4 are located in the upper part of which 3. Between the top layer 1 and the bottom layer, 7 there are properly shaped edges 5.

Figure 25:
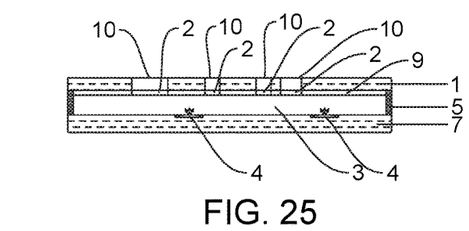

FIG. 25 presents the aforementioned building component, which consists of the top layer 1 combined with an additional layer 9, in which the key elements of the design 2 are located. There are additional elements of the design 10 attached to the upper part of the top layer 1. The light transmitting layer 3 is directly connected to the bottom layer 7, the light sources 4 are located in the upper part of which. Between the top layer 1 and the bottom layer, 7 there are properly shaped edges 5.

Figure 26:
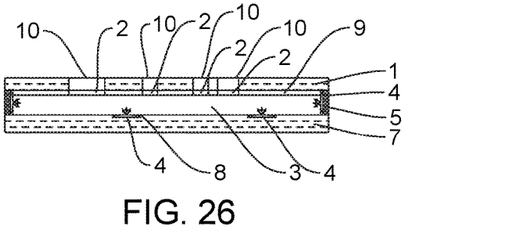

FIG. 26 presents the aforementioned building component, which consists of the top layer 1 combined with an additional layer 9, in which the key elements of the design 2 are located. There are additional elements of the design 10 attached to the upper part of the top layer 1. The light transmitting layer 3 is directly connected to the bottom layer 7 the light sources 4 are located in the upper part of which. Between the top layer 1 and the bottom layer, 7 there are properly shaped edges 5.

Figure 27:
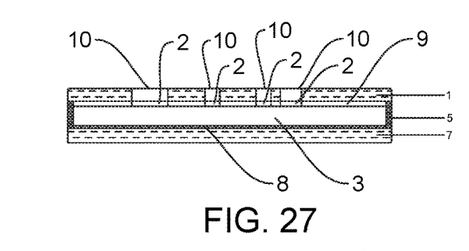

FIG. 27 presents the aforementioned building component, which consists of the top layer 1 combined with an additional layer 9, in which the key elements of the design 2 are located. There are additional elements of the design 10 attached to the upper part of the top layer 1. The light transmitting layer 3 is directly connected to the bottom layer 7 (with the light mat 8 attached to it), the light sources 4 are located in the upper part of which. Between the top layer 1 and the bottom layer, 7 there are properly shaped edges 5.

Figure 28:
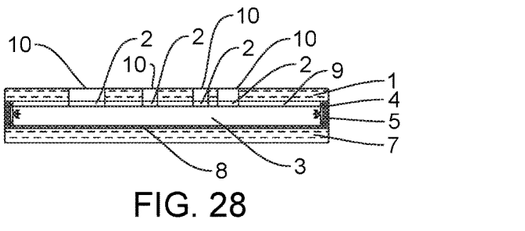

FIG. 28 presents the aforementioned building component, which consists of the top layer 1 combined with an additional layer 9, in which the key elements of the design 2 are located. There are additional elements of the design 10 attached to the upper part of the top layer 1. The light transmitting layer 3 is directly connected to the bottom layer 7 (with the light mat 8 attached to it), the light sources 4 are located in the upper part of which. Between the top layer 1 and the bottom layer, 7 there are properly shaped edges 5.

Figure 29:
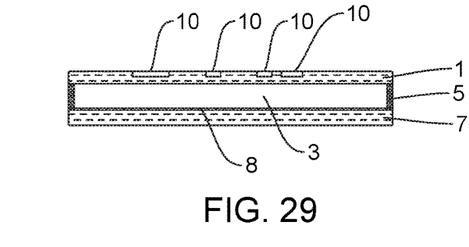
FIG. 29 and FIG. 30 show the intersection of the alternative, seventh version of the building component.

FIG. 29 presents the aforementioned building component, which consists of the top layer 1 combined with the light transmitting layer 3. There are additional elements of the design 10 attached to the upper part of the top layer 1. The light transmitting layer 3 is directly connected to the bottom layer 7 (with the light mat 8 attached to it). Between the top layer 1 and the bottom layer, 7 there are properly shaped edges 5.

Figure 30:
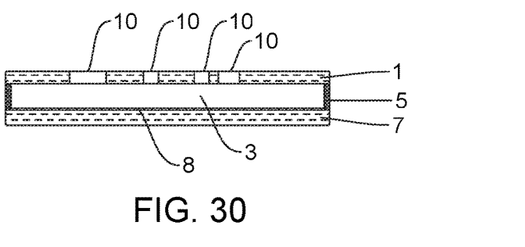

FIG. 30 presents the aforementioned building component, which consists of the top layer 1 combined with the light transmitting layer 3. There are additional elements of the design 10 attached to the upper part of the top layer 1. The light transmitting layer 3 is directly connected to the bottom layer 7 (with the light mat 8 attached to it). Between the top layer 1 and the bottom layer, 7 there are properly shaped edges 5.

Figure 31:
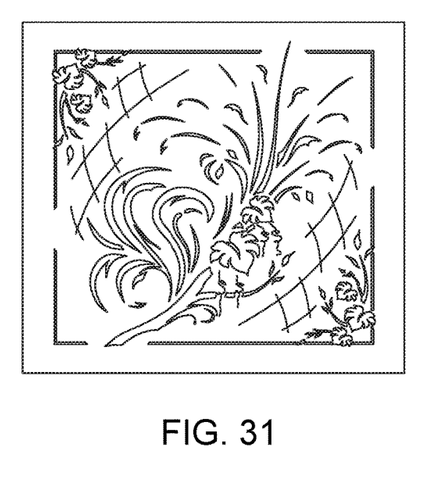

FIG. 31 presents one of the possible shapes of the panel.

Figure 32:
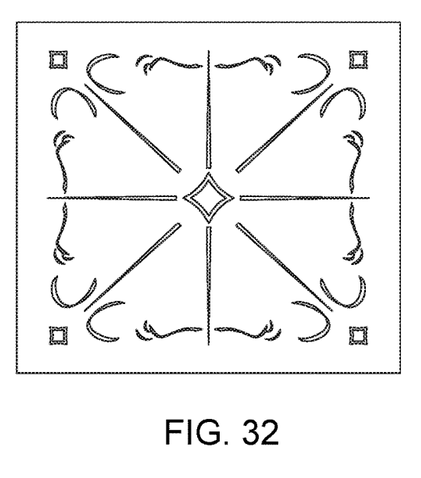

FIG. 32 presents another possible shape of the panel.

The invention claimed is:

1. A building component with light elements for use in interior and external facade finishing in both residential and public facilities building-oriented branches of a construction industry, the component comprising:
   a multiangular outline and design element formed by utilisation of a bottom layer having a thickness in the range of 2 to 18 mm;
   an intermediate light transmitting layer having a thickness in the ranges of 3 to 18 mm and comprising design elements, and transparent filling, wherein the intermediate light transmitting layer is directly connected to the bottom layer, wherein the light elements are positioned in the intermediate light transmitting layer; and
   a top layer having a thickness in the range of 1 to 18 mm and combined with the intermediate light transmitting layer, in which elements of the design are also incorporated and properly filled in, preferably in a transparent manner.

2. The component in accordance with claim 1, wherein the light elements are light sources, wherein the light sources comprise LED diodes, LED diode sets, halogen lamps, cold cathodes, a light mat, or a combination thereof.

3. The component in accordance with claim 2, wherein the light sources are located between the bottom layer and the top layer.

4. The component in accordance with claim 1, wherein the light sources are located in a circular manner between the bottom layer and the top layer.

5. The component in accordance with claim 1, and further comprising a fixed light mat located between the bottom layer and the intermediate light transmitting layer.

6. The component in accordance with claim 1, wherein the top layer is comprised of wood, wood-like materials, ceramics, grout, natural stone, glass, bakelite, conglomerate, metal, fabric and cement, glass with a painted bottom layer, processed glass, plastics, resin or combinations thereof.

7. The component in accordance with claim 1, wherein the top layer incorporates a transparent element produced out of resins, glass, adhesive materials, mineral ores, or combinations thereof.

8. The component in accordance with claim 7, and further comprising a non-transparent element produced out of non-transparent mineral ores, grout, stones, ores or combinations thereof and having a thickness in the range of 1 to 12 mm, wherein the non-transparent element is positioned inside the intermediate light transmitting layer or inside the top layer.

9. The component in accordance with claim 1, wherein the intermediate light transmitting layer incorporates an additional layer comprising glass, resin, PLEXI glass, polycarbonate, adhesive preparations or combinations thereof, wherein the thickness of the additional layer ranging from 1 to 12 mm.

10. The component in accordance with claim 1, wherein the top layer is flat.

11. The component in accordance with claim 1, wherein the intermediate light transmitting layer having a thickness of 3 to 18 mm is water resistant.

12. The component in accordance with claim 1, wherein the top layer is convex.

13. The component in accordance with claim 1, wherein the top layer is concave.

14. The component in accordance with claim 1, wherein the intermediate light transmitting layer having a thickness in the range of 3 to 18 mm is light-transparent.

15. The component in accordance with claim 1, wherein the intermediate light transmitting layer having a thickness in the range of 3 to 18 mm is luminescent.

\* \* \* \* \*